Figure 1:
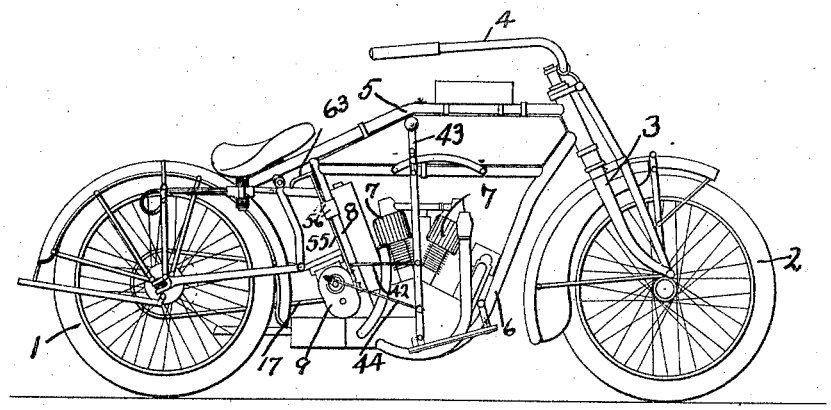

H. D. PEASLEE.
GEAR SHIFTING MECHANISM.
APPLICATION FILED FEB. 8, 1915.

1,321,942.

Patented Nov. 18, 1919.
2 SHEETS—SHEET 1.

WITNESSES:
Elbert K Bremer
A. H. Kephart

INVENTOR.
H. D. Peaslee.
BY
Carlos P. Griffin
ATTORNEY.

H. D. PEASLEE.
GEAR SHIFTING MECHANISM.
APPLICATION FILED FEB. 8, 1915.

1,321,942.

Patented Nov. 18, 1919.
2 SHEETS—SHEET 2.

WITNESSES:
Elbert N Brown
A. H. Kephart

INVENTOR.
H. D. Peaslee.
BY
Carlos P. Griffin
ATTORNEY.

UNITED STATES PATENT OFFICE.

HUGH D. PEASLEE, OF FRESNO, CALIFORNIA.

GEAR-SHIFTING MECHANISM.

1,321,942.  Specification of Letters Patent.  Patented Nov. 18, 1919.

Application filed February 8, 1915. Serial No. 6,867.

*To all whom it may concern:*

Be it known that I, HUGH D. PEASLEE, a citizen of the United States, residing at Fresno, in the county of Fresno, State of California, have invented a new and useful Gear-Shifting Mechanism, of which the following is a specification in such full and clear terms as will enable those skilled in the art to construct and use the same.

This invention relates to a gear shifting mechanism and its object is to provide means whereby a predetermined gear change may be made and whereby the gears may be shifted after the machine has been stopped with the gears engaged in any given set.

It will be understood by those skilled in the art that while mechanisms for making a predetermined change have been invented that such means commonly employ the clutch lever for the disengagement and engagement of given gear sets. It, therefore happens that when the motorcycle or motorcar has been stopped by disengaging the clutch and putting on the brake suddenly, without at the same time taking the precaution to make the automatic shift from the high speed, say to the low speed that it is impossible to again start the car unless it happens to be on a down grade or else the motor is stopped, whereupon the clutch may be reëngaged and a new set of gears engaged or the gears all placed on the neutral position.

With this invention if it occurs that the motorcar or motorcycle is stopped while engaged in high speed the gears may be shifted to the neutral or to the low speed, if desired before the clutch is again engaged, whereupon the machine may be started in the usual manner without stopping the engine.

While the device has been shown as applied to a motorcycle, it will be obvious that it may be equally well applied to a motorcar or any other vehicle and such is the intent of the invention.

An embodiment of the invention is shown in the drawing in which the same reference numeral is applied to the same portion throughout the several views, but I am aware that there are many modifications thereof.

Figure 2:
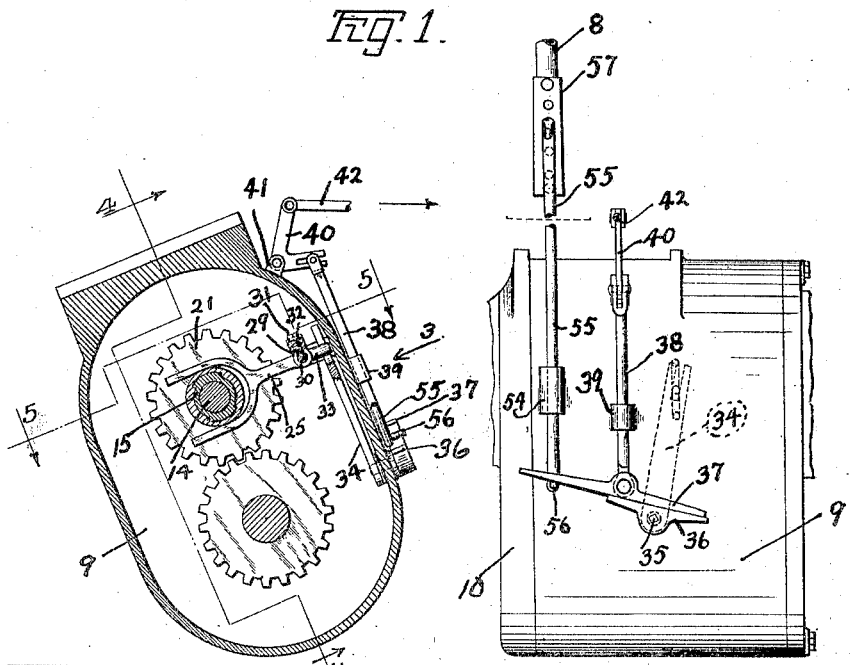
Figure 3:
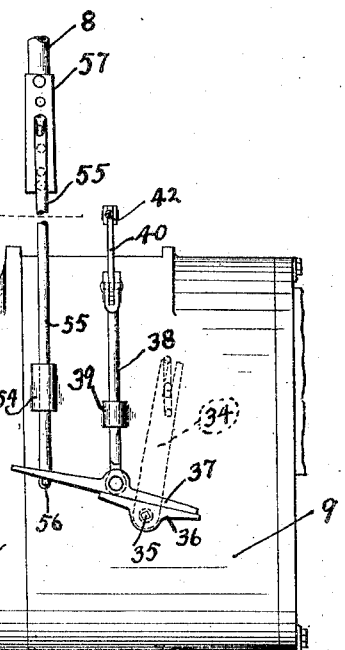
Figure 2A:
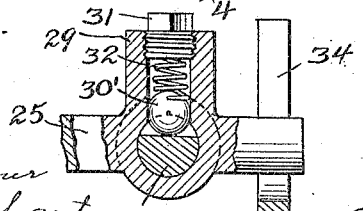
Figures 4, 5:
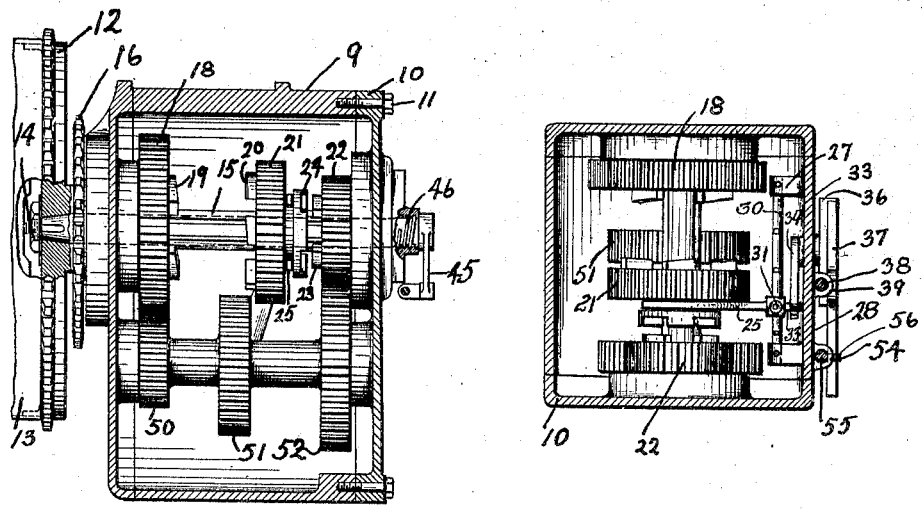
Figure 6:
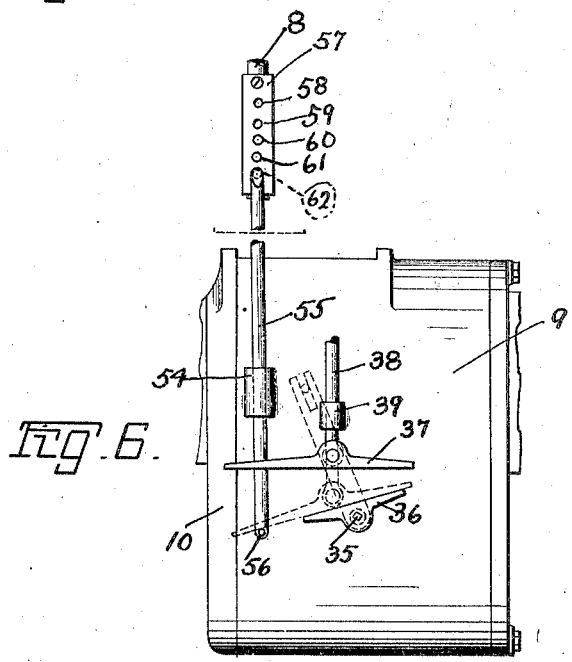

Figure 1 is a side elevation of a motorcycle having this invention applied thereto, Fig. 2 is a sectional view of the gear box, the plane of section being the same as the plane of Fig. 1, Fig. 2ᴬ is a detail partly in section illustrating a portion of the gear shifting fork and gear shifting mechanism showing the ball for locking the shifter in a given position, Fig. 3 is a view in elevation of the gear box looking in the line of the arrow 3 Fig. 2, Fig. 4 is a sectional view of the gear box and a portion of the driving mechanism on the line 4—4 Fig. 2, Fig. 5 is a plan view of the gear box on the line 5—5 Fig. 2, Fig. 6 is a front elevation of the gear box looking in the line of the arrow 3 showing the operating mechanism in a different position from that shown in Fig. 3.

The numeral 1 represents the rear or driving wheel of the motorcycle, 2 the front wheel thereof which is substantially connected by means of the steering fork 3 with the handle bars 4. Extending from the rear wheel forwardly to the front of the machine is a frame 5 having a drop member 6 for the support of the engine 7 and related parts. Below the seat a member 8 connects the upper part of the frame with the drop member 6 and immediately behind is the gear box 9.

The gear box 9 has one side 10 of said box removable and secured thereto by means of suitable bolts 11 and is of a well known construction having a driving sprocket wheel 12 within the drum of which is a suitable clutch 13 operated by means of a shaft 14 extending through the tubular shaft 15 on which the sprocket wheel 12 is rigidly mounted. At the side of the sprocket wheel 12 there is a sprocket wheel 16 from which the driving chain 17 extends around the sprocket wheel on the rear wheel of the machine.

The sprocket wheel 16 has a boss extending from the gear wheel 18 and rigidly connected therewith. The gear wheel 18 has clutch teeth 19 on the side thereof which teeth may engage opposite placed teeth 20 on a slidable gear 21. Adjacent the opposite side of the gear case the shaft 15 has a gear 22 revoluble thereon which carries clutch teeth on its side which may be engaged with oppositely placed clutch teeth on the gear wheel 21. The gear wheel 21 is grooved to receive a fork 25 which fork is slidable on a rod 30 carried by lugs 27 and 28 within the gear case.

The fork 25 has an upwardly projecting boss 29 within which a small ball 30' is secured to the spiral spring 32 bearing thereon and being held in place by means of a plug 31. The fork also has a backwardly projecting portion 33 which is engaged by the lever 34 pivoted on a pin 35 near the bottom of the gear case. This pin carries a shoe 36 which shoe is intended to contact with an oppositely placed shoe 37 pivoted on a movable rod 38. The rod 38 slides through a lug 39 projecting from the side of the gear case and at its upper end it has a pin working in a slot of a bell crank lever 40, which bell crank lever is pivoted at 41 to the upper portion of the gear case. This bell crank lever is connected by means of a rod 42 with the clutch operating lever 43. A rod 44 connects the clutch lever 43 with a lever 45 which moves the shaft 14 longitudinally to engage or disengage the clutch as may be required, said shaft 14 having threads 46 which engage the gear case for the operation of the shaft 14 and the clutch within the drum 13. The particular type of clutch forms no part of the present invention.

In the lower portion of the gear box there is a shaft carrying three gears 50, 51 and 52 and the relation of the gear 21 to these gears is such that it may engage the gear 51 and drive the gear 18 by way of the gear 51 and gear 50, or if the gear 21 and gear 22 are engaged at their clutch faces the gear 21 will drive the gear 22 and the gear 52 and through the gear 50 will drive the gear 18. In a similar way the gear 21 may engage the gear 19 at its opposite clutch face and this directly drive the gear 18.

The clutch mechanism is so set that the clutch drum 13 will be disengaged when the clutch lever 43 is pushed forwardly so that in Fig. 3 the clutch drum is disengaged and the gear clutch shifting levers are shown in contact with one another to give the desired movement to the gear 21. On the side of the gear box adjacent the lug 39 there is another lug 54 through which the operating rod 55 extends, said rod having a stop 56 to determine the extent of movement of the gear shifting shoe 37.

It is to be observed that in Figs. 3 and 6 the upper portion of the rod 55 and its locking plate has been rotated 180 degrees for purposes of illustration.

On the frame 8 there is another projecting lug 56' through which the operating rod 55 passes and just above the lug 56' there is a plate 57 secured on the back of the member 8, said plate having a plurality of holes 58, 59, 60, 61 and 62 therein to determine the position the shoe or lever 37 will occupy when a given gear shift is to be made. The rod 55 has an operating handle 63 within convenient reach of the rider and it also has a projection which is capable of springing into the holes 59 to 62 as may be required to hold it in a given adjustment.

The operation of the apparatus is as follows: Assuming the engine to be running and the clutch drum 13 engaged with the gear 21 free to rotate, the rider will then set the rod 55 to the desired gear change, the operating shoe 37 being then in the position shown in Fig. 6, whereupon the clutch lever will be pushed forward, the rod 38 will be pushed down and the shoe 37 will assume a position determined by the stop 56 and pivot point 35, but at the same time the shoe 36 will be compelled to move to a position such that its face is parallel to the face of the shoe 37 thereupon engaging the low speed for example. As soon as the low speed has been engaged the operator may engage his clutch, pulling the shoe 37 out of engagement with the shoe 36 and shifting his clutch lever 43 backwardly, whereupon the car or motorcycle will be engaged with the engine and move forward. While running the gear 21 may be suitably shifted to engage another gear by shifting the rod 55 to the intermediate position for example, whereupon the clutch may be again disengaged and the lever or shoe 36 may be brought to a neutral position.

As soon as the proper speed has been reached the high speed position may be assumed, note Fig. 6, whereupon the clutch may be again disengaged and the lever 34 will be brought to the position shown in dotted lines in Fig. 6 with the high speed engaged. Now, assuming the motorcycle or car to have been stopped suddenly without an opportunity to shift the rod 35 it will be apparent that if the operator pulls up on the rod 55 when the clutch is disengaged that he will be able to shift the gear 21 to a neutral position or into the low speed if he so desires because by pulling upon the lug 56 the shoe 36 is compelled to shift its position to correspond with the position of the shoe or lever 37, and the clutch lever may be slightly moved by hand to assist in shifting the gears should the gears stick.

It will be observed that an essential feature of the operation of this device lies in the positioning of the pivot point of the lever 37 off center with respect to the pivot point 35, thereby enabling the shoe or lever 36 to be moved through the desired angle.

Having thus described my invention what I claim as new and desire to secure by Letters Patent of the United States, is as follows, modifications within the scope of the claims being expressly reserved:

1. In a gear shifting device, a variable speed transmission gearing including a shiftable gear element, a clutch operating lever, a lever for operating said shiftable element, a stop for determining the position the shiftable element is to assume when the desired gear change is to be made, means whereby said stop may be moved to change the position of the shiftable gear element when the clutch lever is in the disengaged position, and operative connections between the gear shifting lever and the clutch lever and extending into the path of said stop, whereby the gears may be shifted from one position to another.

2. The combination of a transmission mechanism including a shiftable gear changing element, a shifting member for said element, a clutch adapted to drive the transmission mechanism, means to disengage the clutch and to operate said shifting member and effect a selected gear change, and a slidable rod movable independently to effect a given gear change while the clutch is completely disengaged and before the reëngagement thereof.

3. The combination of a transmission mechanism embodying a shiftable gear changing element, a shifting member for said element, a clutch adapted to drive the transmission mechanism, means to disengage the clutch and to operate said member to effect a selected gear change, and a slidable rod carrying a stop to effect selected gear changes while the clutch is completely disengaged and before the reëngagement thereof.

4. The combination with a shaft, clutch and variable speed transmission mechanism therefor, of a plurality of sets of power transmission elements, selective mechanism for making any of the sets of transmission elements effective singly, means for placing such selective set of elements in driving relation with the shaft, said means also being operable to return the selected set of transmission elements to the natural position when the clutch is disengaged from the driving shaft and without the reëngagement thereof with said shaft.

5. The combination with a shaft, a clutch therefor, an operating lever for the clutch, of transmission mechanism, including sets of power transmission elements, selector mechanism for selecting any set of elements to be placed in driving relation with the shaft, means operable from the clutch shifting lever for placing such selected set of transmission elements in driving engagement with the shaft, and means to select and place in operation any other set of transmission elements while the clutch is disengaged and without the reëngagement thereof.

6. The combination with a shaft, clutch and variable speed transmission mechanism therefor, of a plurality of sets of power transmission elements, means for placing any set of said transmission elements in or out of driving relation with the shaft at selected times, and means independent of the clutch whereby a different set of transmission elements may be selected and engaged when the clutch is fully disengaged without the reëngagement thereof.

7. The combination with a shaft, a clutch and lever for operating the clutch, of sets of power transmission gears, an arm for shifting said gears, a rod coördinated with said arm for actuating it and means whereby said gears may be shifted to different positions either by the operation of the clutch operating mechanism or by the slidable rod when the clutch is held wholly disengaged.

8. The combination of a shaft, a clutch, variable speed transmission mechanism having a shiftable gear changing element, a clutch operating lever, a slidable rod carrying a stop and a pivoted bar connected with the clutch operating mechanism, said bar being effective to shift the position of the gear either by the operation of the clutch or by the operation of the stop when the clutch is completely disengaged.

9. The combination with a shaft, of a clutch therefor, a variable speed transmission mechanism connected therewith, including a plurality of sets of gears, selector mechanism for selecting the desired set of gears to be placed in driving relation with the shaft, and means coöperating with said selector mechanism for placing such selected set of gears in driving relation with the shaft, said means being also operable to return said set of gears to the neutral position, the selector mechanism being movable into position for selecting another of the sets of gears while the clutch is at rest and held fully disengaged.

10. The combination with a shaft, of a clutch therefor, a clutch operating lever, transmission gears, means operable from the clutch lever for engaging the desired set of transmission gears at will, and manual means for selecting one set of transmission elements while another is in operation, such selected elements being moved into operation by a subsequent actuation of the clutch lever, and such selecting means being capable of being moved to effect a desired gear change while the clutch operating lever is at rest and the clutch is completely disengaged.

11. The combination with a shaft, of a clutch and transmission gears, a shifting member for one of said gears, a clutch operating lever, means to preselect a given gear change, which change is effected upon the disengagement of the clutch, said means being capable of being moved during the complete disengagement of the clutch to control a subsequent gear change, and connections whereby said operating lever in coöperation with said preselecting means will effect said preselected gear change when the clutch is disengaged.

In testimony whereof I have hereunto set my hand this 30th day of January, A. D. 1915, in the presence of the two subscribed witnesses.

HUGH D. PEASLEE.

Witnesses:
R. C. COCHRANE,
OWEN JAMES.